July 19, 1966 R. A. RUEHRWEIN 3,261,726
PRODUCTION OF EPITAXIAL FILMS
Filed Oct. 9, 1961

INVENTOR.
R. A. RUEHRWEIN
BY
W. I. ANDRESS.
ATT'Y.

United States Patent Office 3,261,726
Patented July 19, 1966

3,261,726
PRODUCTION OF EPITAXIAL FILMS
Robert A. Ruehrwein, Clayton, Mo., assignor to Monsanto Company, a corporation of Delaware
Filed Oct. 9, 1961, Ser. No. 143,882
6 Claims. (Cl. 148—33.4)

The present invention relates to a method for the production of epitaxial films of large single crystals of inorganic compounds. Epitaxial films which may be prepared in accordance with the invention described herein are prepared from volatile compounds and elements of beryllium, zinc, cadmium and mercury with volatile compounds and elements of sulfur, selenium and tellurium. Typical compounds within this group include the binary compounds beryllium sulfide, zinc selenide, cadmium telluride, mercury selenide and cadmium sulfide. As examples of ternary compositions within the defined group are those having the formulae $ZnS_xSe_{(1-x)}$ and $CdS_xSe_{(1-x)}$, $x$ having a numerical value greater than zero and less than 1.

It is an objective of the invention to provide new articles of manufacture useful as semiconductor components in various electronic devices such as junction type photovoltaic cells, photoelectro magnetic energy conversion cells, transistors and photoconductors.

It is also an object of this invention to provide a new and economical method for the production of the above mentioned articles of manufacture which are characterized as having epitaxial films of single crystal II–VI compositions having the cubic (ZnS) structure deposited on various substrate materials.

The specific II–VI compounds of this invention are of unusual purity and have the necessary electrical properties for use as semiconductor components and are prepared by the reaction of a gaseous II compound, such as mercury halide and a gaseous VI compound, such as tellurium halide in the presence of hydrogen. Examples of mercury compounds which are gaseous under the present reaction conditions include the mercury halides, e.g., mercury dichloride, mercury dibromide, and mercury diiodide; and also alkyl mercury compounds such as dimethyl mercury, diethyl mercury, dipropyl mercury, diisopropyl mercury, and di-tert-butyl mercury. Other Group II starting materials which are employed in the present invention include the elements beryllium, zinc, cadmium and mercury as well as their halides and alkyl compounds. Such metals are preferably employed as the halides, for example, the chlorides, bromides and iodides, although the various alkyl and halo-alkyl derivatives may similarly be used. The Group VI elements employed per se or compounds thereof which are of particular utility include tellurium halides and their hydride derivatives. The elements or their chlorides are preferred as the source material for the Group VI components employed in the present method. The halides which are preferred include sulfur monochloride, sulfur monobromide and sulfur dichloride, selenium tetrachloride and tellurium tetrachloride.

In conducting the vapor phase reaction between the Group II and the Group VI component for the production of a crystalline solid II–VI compound of the present class, it is essential that gaseous hydrogen be present in the system, and that oxidizing gases be excluded. However, when the Group II and Group VI elements (or hydrides) are used simultaneously it is unnecessary to use molecular hydrogen, but it may be used as a carrier. The mole fraction of the II component in the gas phase (calculated as the mole fraction of the monatomic form of the II compound or element) preferably is from 0.01 to 0.15, while the mole fraction of the VI component is from 0.05 to 0.50 (also calculated with respect to the monatomic form of the VI compound or element). The mole fraction of the hydrogen may vary in the range of from 0.35 to 0.94. It should be recognized that this representation of partial pressure imposes no limitation upon the total pressure in the system which may vary in the range of from 0.1 micron to several atmospheres, for example, 7500 mm. Hg.

The mole fraction of the Group VI starting material such as halide, for example, tellurium tetrachloride, is preferably at least equivalent to, and still more preferably greater than the mole fraction of the Group II component, for example, zinc dichloride, or other Group II compound which is employed. A preferred embodiment is the use of a mole fraction for the Group VI component which is at least twice that of the Group II component. The mole fraction of hydrogen should then be at least twice that of the combined mole fraction of the Group II and Group VI components.

The temperature used in carrying out the reaction between the above described II component and the VI component will generally be above about 25° C. to as much as 1500° C., a preferred operating range being from 400° C. to 1200° C. and a still more preferred range being from 500° C. to 1100° C. In any event, the reaction is carried out below the melting (or decomposition) point of the substrate or material being deposited.

The only temperature requirements within the reservoirs containing the Group II and Group VI component sources are that the reservoirs be maintained above the dew points of the vaporized components therein. For the II compound or element this is usually within the range of from 200–1000° C. and for the VI compound, from +100 to 900° C. The time required for the reaction is dependent upon the temperature and the degree of mixing and reacting. The II and VI gaseous components may be introduced individually through nozzles, or may be premixed as desired.

The apparatus employed in carrying out the process of the present invention may be any of a number of types. The simplest type constitutes a closed tube of a refractory material such as glass, quartz or a ceramic tube such as mullite into which the starting reactant materials are introduced together with the hydrogen vapor. The tube is then sealed off and subjected to temperatures within the range of from 25 to 1500° C. for a period of from less than one minute to hour or more, until the reaction is complete.

The contacting and vapor phase precipitation may be carried out in a closed system which is completely sealed off after the hydrogen is introduced with the II component and the VI component, or by use of a continuous gas flow system. The pressure which is obtained in the single-vessel, closed system corresponds to the pressure exerted by the added hydrogen vapor at the operating temperatures. The pressure in the system may be varied over a considerable range such as from 0.1 micron to 10 atmospheres, a preferred range being from 0.5 to 1.0 atmosphere.

On a larger scale, the present process is operated as a continuous flow system. This may constitute a simple reaction tube in which the substrate crystal is located and in which the hydrogen gas is then passed to flush oxygen from the system. Into this tube are passed the Group II and Group VI reactants carried by hydrogen along the same or one or more additional conduits. The II–VI compound formed in the reaction tube deposits as an epitaxial layer on the substrate crystal. Various other modifications including horizontal and vertical tubes are also contemplated, and recycle systems in which the exit gas after precipitation of the single crystal product is returned to the system is also desirable, particularly in larger scale installations.

In addition to making the epitaxial films by providing separate sources of the Group II component and the Group VI component it is also possible to make the epitaxially grown crystals of the present invention by reacting hydrogen chloride, hydrogen bromide, or hydrogen iodide with a II–VI compound at a sufficiently elevated temperature to provide gaseous products consisting of Group II compounds and Group VI elements or compounds. These gaseous reaction products will then further react in a region of the system at lower temperature to redeposit the original II–VI compound. Consequently, the present process is adaptable to a wide variety of starting materials and may also be used to obtain products of very high purity by employing the II–VI compound for redeposition. The reaction system accordingly may consist of a number of zones to provide for the introduction of volatile components which undergo reaction to form the ultimate II–VI epitaxial film.

An advantage of the present method for the production of epitaxial films of II–VI compounds by the reaction in the vapor phase of a Group II component and Group VI component is the ease of obtaining high purity products. In contrast to this method, the conventional method for the preparation of II–VI compounds beginning with the respective elements from the Group II and Group VI series consists of merely adding together the two reactants. The high-temperature vapor-phase reaction employed in the present method inherently introduces a factor favoring the production of pure materials, since the vaporization and reaction of the respective Group II and Group VI components results in a rejection of impurities. The desired reaction for the production of the II–VI compound occurs between the Group II component, the Group VI component, and hydrogen to yield the II–VI compound. As a result, it is found that unusually pure materials which are of utility in various electrical and electronic applications such as in the manufacture of semiconductors are readily obtained.

The most important aspect of this invention is the provision of a means of preparing and depositing epitaxial films of the purified single crystal material onto various substrates. These deposited films of any desired thickness permit the fabrication of new electronic devices discussed hereinafter. The characteristic feature of epitaxial film formation is that starting with a given substrate material, e.g., gallium arsenide, having a certain lattice structure and oriented in any direction, a film, layer or overgrowth of the same or different material may be vapor-deposited upon the substrate. The vapor deposit has an orderly atomic lattice and settling upon the substrate assumes as a mirror-image the same lattice structure and geometric configuration of the substrate. When using a certain material, e.g., gallium antimonide as the substrate and another material, e.g., mercury selenide as the film deposit it is necessary that lattice distances of the deposit material closely approximate those of the substrate in order to obtain an epitaxial film.

A particular advantage of the present method for the production of epitaxial films of the II–VI compounds by the reaction in the vapor phase of a Group II component and a volatile Group VI component in the presence of hydrogen is that in forming the epitaxial layer on the substrate, the substrate is not affected and therefore sharp changes in impurity concentration can be formed. By this method it is possible to prepare sharp and narrow junctions, such as p-n junctions, which cannot be prepared by the conventional methods of diffusing and alloying.

The growing of an epitaxial film by the process of the present invention is carried out by placing a single crystal, polished and oriented, of the substrate material in a silica or other tube. The foundation material is thus available for the manufacture of an epitaxial film which will have the further characteristic of being monocrystalline. In order to conduct this process the reactants may be vaporized from reservoirs containing the same directly into the reaction tube, or may be carried thence by streams of hydrogen. When streams of hydrogen are employed to carry the reactants into the reaction zone, separate streams of hydrogen which may be of equal or unequal volume flow are led through reservoirs containing the reactants, heated to appropriate temperatures to maintain the desired vapor pressure of the reactant. For example, the employment of one region at a considerably higher temperature will introduce relatively larger proportions of such reactant. The separate streams of hydrogen carrying, for example, cadmium bromide, mercury chloride and selenium chloride are led into the silica tube containing the substrate crystal and heated to the reaction temperature. A single crystal film of compound, in the present example, $Cd_{0.85}Hg_{0.15}S$, deposits on the substrate and is oriented in the same direction as the substrate. In the more general case the compound $$M_xR_{(1-x)}T_yZ_{(1-y)}$$

where $x$ and $y$ can be any value from zero to one, M and R represent a Group II element and T and Z represent a Group VI element, depends upon the relative concentration or partial pressure of the M and R reactants or of the T and Z reactants in the reactor tube.

The thickness of the epitaxial film may be controlled as desired and is dependent upon reaction conditions such as temperatures within the reactor, hydrogen flow rates and time of reaction. In general, the formation of large single crystals and thicker layers is favored by higher temperatures as defined above, and lower hydrogen pressures and larger flow rates.

As stated hereinbefore, the epitaxial films formed in accordance with this invention comprise compounds formed from elements or volatile compounds of elements of Group II with elements or volatile compounds of Group VI. Included in this group of compounds are the sulfides, selenides and tellurides of beryllium, zinc, cadmium and mercury. In addition to the use of the above compounds by themselves, mixtures of these compounds are also contemplated as epitaxial films, e.g., zinc sulfide and cadmium telluride mixed in varying proportions when produced by the instant process produce suitable semiconductor compositions.

Representative individual binary crystals of the Group II and Group VI components contemplated in this invention are listed in the table below with the value of their forbidden energy gap.

TABLE

| Compound: | Energy gap, electron volts |
|---|---|
| ZnS | 3.7 |
| ZnSe | 2.6 |
| CdS | 2.4 |
| ZnTe | 2.1 |
| CdSe | 1.77 |
| CdTe | 1.50 |
| HgSe | 0.65 |
| HgTe | 0.025 |

It is well known that combinations of these compounds can be formed to give mixed binary crystals, including ternary and quarternary compositions, which have a value of the forbidden energy gap different from those of the two parent binary crystals and usually having a value that is intermediate between those of the parent binary crystals. For example, the forbidden energy gap of $Cd_{.5}Hg_{.5}Te$ is about 0.25 electron volt. Other such combinations have the formulae $BeS_xSe_{(1-x)}$, $Be_xZn_{(1-x)}S$, $ZnSe_xTe_{(1-x)}$, $Zn_xCd_{(1-x)}Se$, $CdSe_xTe_{(1-x)}$, $Cd_xHg_{(1-x)}Te$, $HgSe_xTe_{(1-x)}$, $Zn_yCd_{(1-y)}Se_xTe_{(1-x)}$ and $$CdS_x(Se_yTe_{(1-y)})_{(1-x)}$$

where $x$ and $y$ have a numerical value greater than zero and less than one.

Materials useful as substrates herein include the same materials used in the epitaxial films as just described and, in addition, compounds of elements of Groups III and V (III–V compounds) and compounds of Groups I and VII elements (I–VII compounds), having the cubic (ZnS) structure, and the elements silicon and germanium, as well as metals having the cubic crystalline structure are suitable substrates. Suitable dimensions of the seed crystal are 1 mm. thick, 10 mm. wide and 15–20 mm. long, although larger or smaller crystals may be used.

As will be described hereinafter, the materials used herein either as films or substrates or both may be used in a purified state or containing small amounts of foreign materials as "doping" agents.

The significance of structures having epitaxial films is that electronic devices utilizing "surface junctions" may readily be fabricated. Devices utilizing n–p or p–n junctions are readily fabricated by vapor depositing the host material containing the desired amount and kind of impurity, hence, conductivity type, upon a substrate having a different conductivity type. In order to obtain a vapor deposit having the desired conductivity type and resistivity, trace amounts of an impurity, e.g., an element or compound thereof selected from Group I of the periodic system, e.g., copper, silver and gold or an element or compound thereof selected from Group V of the periodic system, e.g., phosphorus, arsenic and antimony are incorporated into the reaction components in order to produce p-type conductivity, and an element or compound thereof from Group III, e.g., boron, aluminum, gallium and indium to produce n-type conductivity. These "impurities" are carried over with the reactant materials into the vapor phase and deposited in a uniform dispersion in the epitaxial film of the formed product on the substrate. Since the proportion of dopant deposited with the II–VI compound is not necessarily equal to the proportion in the reactant gases the quantity of dopant added corresponds to the level of carrier concentration desired in epitaxial film to be formed.

The doping element may be introduced in any manner known in the art, for example, by chemical combination with or physical dispersion within the reactants. Other examples include adding volatile dopant compounds such as $InCl_3$ to the reservoir of the Group II and/or VI components, or the dopant can be added with a separate stream of hydrogen from a separate reservoir.

The substrate materials used herein may be doped by conventional means known to the art. For example, the doping agent may be introduced in elemental form or as a volatile compound of the dopant element during preparation of the substrate crystal in the same manner described above for doping the epitaxial film. Also, the dopant may be added to a melt of the substrate compound during crystal growth of the compound. Another method of doping is by diffusing the dopant element directly into the substrate compound at elevated temperatures.

The quantity of dopant used will be controlled by the electrical properties desired in the final product. Suitable amounts contemplated herein range from $1\times10^{15}$ to $5\times10^{20}$ atoms/cc. of product.

Vapor deposits of the purified material having the same conductivity type as the substrate may be utilized to form intrinsic pp+ or nn+ regions.

Variations of the preceding techniques permit the formation of products having a plurality of layers of epitaxial films upon the substrate, each layer having its own electrical conductivity type and resistivity as controlled by layer thickness and dopant concentration. Since the vapor deposited material assumes the same lattice structure as the substrate wherever the two materials contact each other, small or large areas of the substrate may be masked from or exposed to the depositing host material. By this means one is able to obtain small regions of surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., cadmium telluride is vapor deposited upon a substrate of indium antimonide. Subsequently, a quantity of the same material with different doping agents or different concentrations of the same dopant or another of the described materials may be vapor deposited from starting materials comprising these elements with a fresh quantity of hydrogen as a second epitaxial film over the epitaxial film of cadmium telluride already deposited on the substrate. This procedure with any desired combination of layers can be repeated any number of times.

Alternatively, after the first layer of material is vapor deposited upon the substrate, the substrate with this epitaxial layer is removed to another reaction tube and a second material is then vapor deposited as before upon the substrate with its first epitaxial layer, thereby forming a two-layered component.

In each of these processes, the thickness of the epitaxial film and the impurity concentration are controllable to obtain a variety of electrical effects required for specific purposes as discussed elsewhere herein.

Various electronic devices to which these epitaxially filmed semiconductors are applicable include diodes, (e.g., tunnel diodes), parametric amplifiers, transistors, high frequency mesa transistors, solar cells, thermophotovoltaic cells, components in micromodule circuits, rectifiers, thermoelectric generators, radiation detectors, optical filters, watt-meters, and other semiconductor devices.

The drawings of the present invention illustrate certain specific embodiments of the invention, wherein each device utilizes an epitaxially filmed II–VI semiconductor component.

Figure 1:
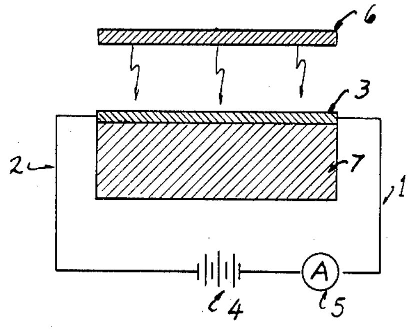
FIGURE 1 shows a photocell.

This invention will be more fully understood with reference to the following illustrative specific embodiments:

*Example 1*

This example illustrates the formation and deposition of a p-type CdS epitaxial film on n-type AlAs as the substrate.

A polished crystal of n-type AlAs one millimeter thick and containing $1\times10^{17}$ carriers/cc. is placed in a fused silica reaction tube located in a furnace. The AlAs crystal is placed on a silica support inside said tube. The reaction tube is heated to 1000° C. and a stream of hydrogen is directed through the tube for 15 minutes to remove oxygen from the surface of the AlAs.

A stream of hydrogen is then directed through a reservoir of $S_2Cl_2$ maintained at about 115° C. thus vaporizing the $S_2Cl_2$ which is then carried by the hydrogen through a heated tube from the reservoir to the reaction tube containing the AlAs substrate crystal.

Meanwhile, a separate stream of hydrogen is conducted through a separate tube containing a reservoir of $CdCl_2$ heated to about 680° C. This reservoir also contains a quantity of AgI (as a doping component). From this heated tube the $CdCl_2$ and AgI are carried by the hydrogen to the reaction tube. In the system the mole fractions of the $S_2Cl_2$, $CdCl_2$ and $H_2$ are 0.05, 0.15 and 0.80, respectively. The separate streams of vaporized $S_2Cl_2$, $CdCl_2$ and AgI conjoin in the fused silica reaction tube where a reaction occurs between the cadmium and sulfur components in which a single crystal film of p-type cadmium sulfide is formed on the substrate crystal of AlAs.

The epitaxially grown crystal removed from the reaction tube is composed of n-type aluminum arsenide on one (bottom) face and p-type cadmium sulfide, on the opposite (top) face and contains about $10^{18}$ carriers per cc.

X-ray diffraction patterns of the crystal show that the deposited layer is single crystal in form and oriented in the same fashion as the substrate.

Rectification tests show that a p-n junction exists at the region of the junction between the epitaxial layer and the seed crystal substrate.

*Example 2*

This example illustrates the formation and deposition of an epitaxial film of n-type ZnSe on p-type GaAs as the substrate.

A polished seed crystal of p-type GaAs doped with cadmium to a carrier concentration of $5.8 \times 10^{18}$ carriers/cc. is placed in a fused silica reaction tube located in a furnace. The GaAs seed crystal is placed on a graphite support inside said tube. The reaction tube is heated to 650° C. and a stream of hydrogen is directed through the tube for 15 minutes to remove oxygen from the surface of the GaAs.

A stream of hydrogen is then directed through a reservoir of $GaCl_3$ (as the dopant) maintained at about 45° C. thus vaporizing the $GaCl_3$ which is then carried by the hydrogen through a heated tube from the reservoir to the reaction tube containing the GaAs seed crystal. Meanwhile, separate and equal streams of hydrogen are conducted through separate tubes containing in one of them a reservoir of $ZnBr_2$ heated to about 500° C. and in the other a body of elemental selenium heated to about 637° C. From the heated tubes the elemental selenium and zinc bromide are carried by the hydrogen on through the tubes to the reaction tube. In the system the mole fractions of the $ZnBr_2$, elemental selenium are 0.05, 0.15 and 0.80, respectively. The separate streams of vaporized reactants conjoin in the fused silica reaction tube heated to about 650° C., where a reaction occurs between the zinc and selenium in which a single crystal film of n-type ZnSe is formed on the seed crystal of p-type gallium arsenide forming thereon an epitaxial layer which exhibits about $10^{18}$ carriers (electrons) per cc.

X-ray diffraction patterns of the substrate crystal show that the deposited layer is single crystal in form and oriented in the same fashion as the substrate.

Rectification tests show that a p-n junction exists at the region of the junction between the epitaxial layer and the seed crystal substrate. When this procedure is repeated using a Group II element, e.g., zinc, and a Group VI compound, e.g., $TeCl_4$, and adjusting the temperatures accordingly, the same results obtain.

*Example 3*

This example illustrates the formation of a product having an HgTe overgrowth on a AgI substrate, said product exhibiting photoconductive effects.

The apparatus and procedure outlined in Examples 1 and 2 are used and followed generally, except that the Group II reservoir contains the compound $HgCl_2$. In a second tube leading to the reaction tube is a reservoir of $TeCl_4$.

A seed crystal of AgI is placed in the reaction tube located in the furnace. The furnace is then heated to 360° C. and a stream of hydrogen directed through the reaction tube for about 20 minutes to remove any oxygen present.

The reservoir of $HgCl_2$ is heated to 210° C. to volatilize the $HgCl_2$ which is conducted by a stream of hydrogen passing through the reservoir, to the reaction tube. Simultaneously, the second tube containing the $TeCl_4$ is heated to about 360° in the presence of a stream of hydrogen. The vaporized $TeCl_4$ is also carried to the reaction tube wherein the $HgCl_2$ reacts with the $TeCl_4$ to produce mercury telluride, HgTe, which deposits from the vapor phase as a uniform layer upon the seed crystal of AgI.

The product, upon examination shows an epitaxial layer of single crystal HgTe having the same crystal orientation as the AgI substrate.

The crystal is then lapped and metallic leads 1 and 2 attached to the HgTe epitaxial film 3 shown in the photocell in FIGURE 1 leading through a current source, e.g., a battery 4, and an ammeter 5. Electrical current is then applied to the crystal and upon irradiating the HgTe face of the crystal from a hot body 6 heated to about 2000° C., the flow of electrical current is increased, thus demonstrating photoconduction. This example further illustrates the utilization of a semiconductor body, i.e., the HgTe film, on a nonconductor base material, i.e., AgI, 7, which arrangement provides unique and extended applications for device fabrication.

*Example 4*

Figure 2:
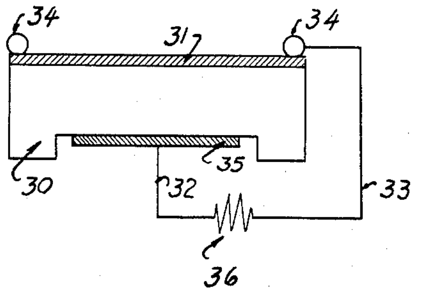
FIGURE 2 shows a photovoltaic device.

This example illustrates the formation and deposition of a p-type epitaxial film of CdTe on n-type CdTe as the substrate, in a photovoltaic cell such as the solar cell as illustrated in FIGURE 2.

The same general procedure outlined in the preceding examples is repeated. The substrate crystal in the reaction tube is an n-type ($10^{17}$ carriers per cc.) CdTe crystal heated to about 650° C. Cadmium bromide, $CdBr_2$, is contained in one reservoir heated to about 600° C. and $TeCl_4$ is contained in a second reservoir heated to about 360° C., while a third reservoir contains CuCl (dopant) heated to 520° C. After flowing hydrogen through the reaction tube for 15 minutes to remove oxygen from the substrate crystal, a stream of hydrogen gas is initiated through the three reservoirs and into the reaction tube heated to 650° C. CdTe begins to epitaxially deposit on the CdTe substrate. The epitaxially grown crystal in the reaction tube is composed of n-type CdTe on one (bottom) face and p-type CdTe on the opposite (top) face contains about $10^{20}$ carriers per cc. (p-type) and is about 1 micron thick. Thus the crystal consists of p-type epitaxial film on an n-type substrate.

The present example also shows a photovoltaic cell. Metallic leads are attached to the n-type substrate and the p-type film and connected through an external load, e.g., a voltmeter. This device, which is schematically shown in FIG. 2 is composed of a major body 30 of n-type CdTe which has a thin layer 31 of p-type CdTe deposited upon the n-type portion as described above. In order to make electrical contact with the n-type material, a lead 32 is attached to 30 by means of a soldered joint, such as indium solder or indium paint 35 joining lead 32 to body 30.

In the present device the only p-n junction should be just below the light receptive surface. All other surfaces should be protected during deposition, provided with a counter layer, or be lapped, cut or etched to eliminate the epitaxial layer from all but the light surface. A contact is then made with the n-type body. The second electrical contact in addition to element 32 is made directly with the p-surface by a ring 34 at the top or side of the disc and lead 33 to provide contact with the external measuring circuit.

In the operation of the photovoltaic cell which is also suitable for use as a solar cell, light is directed towards the free face corresponding to the p-type cadmium telluride as an epitaxial layer with the result that an electric signal is obtained from leads 32 and 34.

It is desirable that the epitaxial layer 31 be as thin as possible, for example $10^{-5}$ cm. in order to permit high efficiency to be obtained, or in general, less than $4 \times 10^{-4}$ cm.

In a modification especially suitable for a solar cell the parent layer, element 30, is n-type (doped) cadmium telluride deposited epitaxially as described in Example 4, and containing $1 \times 10^{17}$ carriers/cc. The p-n junction is formed using vapor deposition of p-type cadmium telluride (CuCl doped, about $10^{19}$ carriers/cc.) and with this external layer 31 being about $2 \times 10^{-4}$ cm. in depth.

In general for a solar cell, this layer is made $1 \times 10^{-4}$ to $2 \times 10^{-4}$ cm. In the present device the surface area of the cell is 1.250 cm.$^2$, but the method is applicable equally well to large areas. In devices of the type described in this example conversion efficiencies of about 18% are obtained.

The present photovoltaic cells prepared by vapor deposition of an epitaxial layer are easily made as a part of other apparatus, which cannot be made by conventional diffusion or alloying. For example, a transistor in a micromodule is powered from the output of the photovoltaic (e.g., solar type) cell, making an external power source unnecessary, so that the combination unit can be isolated particularly to avoid short circuiting p and n layers in a transistor.

*Example 5*

This example illustrates the procedure for producing a product having a plurality of layers of different electrical properties.

The procedure here is similar to that followed in the preceding example, and the apparatus is the same.

The reservoir containing the Group II compound, $HgCl_2$, is heated to 210° C. in a stream of hydrogen, while the tube containing a reservoir of the Group VI compound $SeCl_4$ is heated to about 160° C. in a stream of hydrogen and a separate tube containing CuCl (dopant) is heated to about 320° C. in a stream of hydrogen. These separate streams of hydrogen containing the vaporized reactants are conducted to the reaction tube which contains a seed crystal of polished n-type zinc telluride, ZnTe, doped with phosphorus to a carrier concentration of about $5.8 \times 10^{18}$/cc. In the reaction tube previously flushed with hydrogen and heated to 250° C., the $HgCl_2$ reacts with the hydrogen, $SeCl_4$ and CuCl dopant to form p-type mercury selenide, HgSe, which deposits from the vapor phase onto the n-type ZnTe seed crystal. The reaction proceeds for about 15 minutes, after which heating and the flow of the separate streams of hydrogen to these reservoirs is discontinued. Additional reservoirs containing, respectively, $ZnBr_2$ doped with a trace amount of $GaCl_3$ (which, alternatively, may be supplied through a separate reservoir heated to 45° C.) heated to 500° C. and $TeBr_4$ heated to 400° C., are then opened to the reactor which is now heated to 550° C. The hydrogen supply is now opened to stream through the $ZnBr_2$, $GaCl_3$ and $TeBr_4$ reservoirs. Again, the vaporized reactants are carried by the hydrogen to the reaction tube. In the reaction tube the $TeBr_4$ reacts with the doped $ZnBr_2$ to form n-type zinc telluride, ZnTe, which deposits upon the p-type HgSe layer previously deposited on the n-type ZnTe seed crystal.

After the reaction has proceeded to completion, the product, upon examination is found to consist of a substrate of n-type ZnTe, having successive layers of p-type HgSe and n-type ZnTe. These deposited layers exhibit the same X-ray orientation pattern as the single crystal ZnTe substrate indicating the same orientation and single crystal form characteristic of epitaxial films.

The product further exhibits characteristic n-p-n junction properties showing the presence of an n-p junction between the n-type ZnTe and the p-type HgSe and a p-n junction between the latter compound and the n-type ZnTe substrate. When this example is repeated substituting silicon and germanium respectively, for the ZnTe substrate, substantially similar results are obtained.

By the foregoing method any number and combination of epitaxial and non-epitaxial layers may be deposited one upon the other.

An alternative to the foregoing procedure is to connect a fourth tube containing a second Group II compound reservoir and hydrogen supply to the reaction tube at a point near the junction of the tube containing the first Group II compound reservoir and the tube containing the Group VI compound reservoir. The fourth tube is closed off during the first phase of the process, i.e., while the first epitaxial layer is being formed, and thereafter, opened to the system while closing off the tube containing the first Group II compound.

A still further modification of this invention is to use a mixture of Group II compounds in one or more reservoirs and/or a mixture of the Group VI compounds in another reservoir(s) and proceed in the usual manner. An illustration of this modification is shown in the following example wherein an epitaxial film of a ternary composition of II–VI elements is deposited on a ZnTe substrate.

When electrical leads are connected to the three separate n-p-n regions of the crystal prepared in this example, the crystal exhibits transistor action with improved emitter efficiency and improved high frequency response.

*Example 6*

This example illustrates the deposition of ternary compositions of II–VI elements on II–VI substrates.

A polished seed crystal of p-type ZnTe doped with gold to a carrier concentration of $5.5 \times 10^{18}$ carriers/cc. is placed in the fused silica reaction tube. The tube is heated to 650° C. and a stream of hydrogen is directed through the tube for 15 minutes to remove any oxygen present.

Quantities of $CdBr_2$, $HgCl_2$ and $Se_2Br_2$ are placed in reservoirs for the Group II compound reactant as described in preceding examples, and a body of gallium trichloride, $GaCl_3$, as dopant material, is placed in another tube connected to the reaction tube.

A stream of hydrogen is then directed through the reservoir containing the $CdBr_2$, cadmium dibromide, and heated to about 600° C., through the $HgCl_2$ reservoir heated to 230° C., and through the $Se_2Br_2$ reservoir heated to 180° C., while a stream of hydrogen is then passed through the $GaCl_3$ reservoir in another tube heated to about 45° C. The vaporized components in the tubes are then carried by the hydrogen to the reaction tube containing the ZnTe seed crystal. In the reaction tube heated to 650° C., the vaporized components combine and react to form a mixed binary crystal of n-type cadmium mercury selenide, having the formula $Cd_{0.5}\,Hg_{0.5}Se$ which deposits from the vapor phase in single crystal form as an epitaxial film on said p-type ZnTe seed crystal. The p-type mixed crystal layer is shown by X-ray diffraction patterns to have the same crystal orientation as the seed crystal, characteristic of epitaxial layers.

Rectification tests establish the existence of a p-n-p junction between the epitaxial layer and the substrate.

By varying the hydrogen flow rates through the respective Group II and Group VI compound reservoirs according to the foregoing modification of this example, epitaxial films of ternary compositions over the whole range of $Cd_xHg_{1-x}Se$ are obtained, where $x$ has a value less than 1 and greater than zero.

In accordance with the present embodiment of this invention, epitaxial films of ternary compositions of elements of Group II and VI may be prepared merely by reacting one volatile compound of Group II elements with two Group VI compounds or vice-versa, i.e., by reacting two Group II compounds with one Group VI compound in the presence of hydrogen. Thus, epitaxial films of these ternary compositions may be formed by reacting a sum of three Group II compounds and Group VI compounds in any combination in the presence of hydrogen.

*Example 7*

This example illustrates the preparation of epitaxial films of quaternary mixed binary crystals of II–VI elements.

Reservoirs are provided which contain, respectively, $CdBr_2$, heated to about 600° C., $HgCl_2$ heated to about 230° C., $SeCl_4$ heated to about 160° C., $TeCl_4$ heated to about 360° C. and $GaCl_3$ (as dopant) heated to about 45° C. Each reservoir is connected to a quartz, reaction tube containing a polished seed crystal n-type of zinc-doped GaAs ($10^{15}$ carriers per cc.). This arrangement may be varied a number of ways, e.g., by placing each reactant in separate reservoirs along a common conduit to the reaction tube or each reservoir may have its own conduit to the reaction tube.

The vaporized components in the several reservoirs are then conducted by the hydrogen to the quartz reaction tube which is heated to about 650–700° C. The separate streams of hydrogen carrying the reactants converge in the reaction tube, and after about 1 hour a four-component mixed binary crystal having the formula $$Cd_{0.4}Hg_{0.6}Se_{0.5}Te_{0.5}$$

is formed and deposits as an epitaxial film on the GaAs seed crystal.

This product having a gallium arsenide substrate of n-type conductivity and an epitaxial film of p-type conductivity exhibits rectification suitable for use in semiconductor devices.

Similarly, other four-component mixed binary crystals of II–VI compounds within the formula previously recited may be deposited as epitaxial films merely by reacting in the presence of hydrogen at least one volatile Group II element or compound thereof with at least one volatile Group VI element or compound thereof provided that the sum of the Group II components and the Group VI components reacted equals four. That is, one, two or three Group II components may be reacted with, respectively, three, two or one Group VI components in the presence of hydrogen to produce epitaxial films of the quaternary compositions of II–VI elements in this embodiment of the present invention.

*Example 8*

Figure 3:
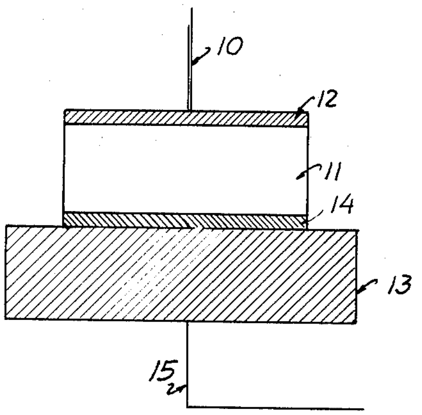
FIGURE 3 shows a rectifier.

The construction of a rectifier is shown in the present example. In FIG. 3, 10 represents a contact electrode of a conventional metal such as tungsten, molybdenum, phosphorus bronze or platinum, which makes a rectifying contact with the present device. Element 11 represents a semiconductor material such as n- or p-type gallium arsenide, GaAs, as the substrate. The epitaxial film 12, of single crystal zinc sulfide, ZnS, which may be of n or p type as discussed below is formed by vapor phase deposition. The ZnS so prepared is a thin layer, which is readily obtained at $10^{-5}$ cm. to 0.05 or preferably $5\times10^{-7}$ to 0.1 cm. These can be far thinner, e.g., to $\frac{1}{10}$ as thin as can be obtained by mechanical sawing using conventional means. The semiconductor substrate 11 is in contact with a base metal 13 formed from a conventional metal such as copper or a similar material. This element 13 desirably has good thermal conductivity. In order to provide good electrical contact between the semiconductor 11 and the base metal 13, a conducting material such as a film of silver, 14 for example, may be employed as the soldering material to provide an ohmic contact of low resistance. The base metal 13 is provided with a lead 15 of copper, etc., of good electrical conductivity which represents the second contact. It can exist in a variety of forms convenient to the device user.

Multiple units of the present rectifier may also be provided such as by making alternate connections between the base 13 and the corresponding lead 15 of the next unit.

In the formation of multiple units, it is an advantage of the present epitaxial ZnS that deposition of lightly-doped regions on the surface or within the structure can readily be attained. A number of alternating high resistivity n and p layers, each relatively thin, may be deposited at the external surface of the device (the product in conventional electronics terminology) to provide an isolation region between deposited layers. This has the advantage of reducing capacitive coupling between separate portions of the structure and also provides a high resistivity path since many back biased diodes must be traversed to go from one region to another within a structure.

*Example 9*

Zinc sulfide, ZnS, as an epitaxial layer is doped to form a p-n junction. A practical embodiment of such doped epitaxial ZnS is as a tunnel diode.

Figure 4:
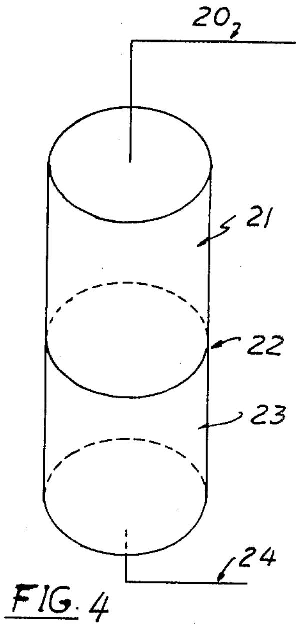
FIGURE 4 shows a tunnel diode.

In FIG. 4, element 20 represents a lead of a conventional metal such as copper, which makes an ohmic contact with the present device. Element 21 of the present device represents epitaxial p-type zinc sulfide. The single crystal ZnS which is n-type as discussed below is formed by vapor phase deposition with the dopant. The ZnS so prepared is a thin layer, of about $10^{-6}$ cm. but in general is readily obtained at $10^{-5}$ cm. to 0.05 or preferably $5\times10^{-7}$ to 0.1 cm. thickness. These can be far thinner, e.g., to $\frac{1}{10}$ as thin as can be obtained by mechanical sawing, using conventional means. The first epitaxial layer 21 is in contact with another vapor deposited layer 23 formed in the same way, but with an opposite type dopant. The junction between the two layers is shown as 22. Element 23 has a lead 24 of a conventional metal such as copper or a similar material. These lead elements 20 and 24 desirably have good thermal conductivity. In order to provide good electrical contact between the semiconductor and the lead metal, silver, for example, may be employed as the soldering material to provide an ohmic contact of low resistance. The present tunnel diode can exist in a variety of forms convenient to the device user. Thus, the example shown here is made as a cylinder of about .1 mm. diameter and .11 mm. thickness.

Doping is easily controlled in the present ZnS crystal and unusually high orders of doping are easily possible, in the manufacture of tunnel diodes which require as much as 0.1% by weight of doping. The carrier concentrations are of the order of $5\times10^{19}$ to $2\times10^{20}$. The dopant is vaporized together with the ZnS or from a separate reservoir to obtain unusually homogeneous distribution of the dopant in the epitaxial film. For example, n-type dopants such as the elements or halides of boron, aluminum, gallium and indium, as well as p-type dopants such as silver, copper, phosphorous, arsenic and antimony or halides thereof are vaporized in the appropriate concentration relative to the ZnS (or other II–VI material described herein).

The distinguishing feature of the tunnel diode is the high concentration of the dopant as shown herein. In this example Ag is the p-type dopant present at a $8\times10^{19}$ carriers/cc. concentration in the first layer. This first layer is produced by depositing the p-type ZnS upon a previously prepared substrate of the same p-type ZnS so that a homogeneous layer is obtained.

In a separate operation, the said Ag doped ZnS is built up by additional vapor deposition of ZnS containing Ga as the n-type dopant with $1\times10^{20}$ carriers/cc. concentration.

It has also been found that the Ga doped layer may be formed first and the Ag doped ZnS deposited thereon.

Another method is the use of a conventional p-doped or n-doped ZnS first layer, which is then built up by vapor phase deposition with oppositely doped epitaxial ZnS.

It will be seen that the products obtained according to the present invention have a variety of applications. For example, in electronic devices it is desirable to have a substantially inert non-conducting base for II–VI epitaxially filmed semiconductors, the product described in Example 3 is highly suitable. Where it is desired to obtain semiconductor components having semiconducting properties in the base material as well as in the epitaxial film, those products described in Examples 1, 2, and 4–8 above are of particular value.

Electronic devices may also be fabricated wherein a semiconducting component comprising an epitaxial film of II–VI compositions is deposited on substrates of metallic conductors having cubic crystal structure, such as gold, silver, calcium, cerium, cobalt, iron, iridium, lanthanum, nickel, palladium, platinum, rhodium, strontium, thorium and copper, and alloys such as Al-Zn, SbCoMn, BTi and $Cr_2Ti$.

Various other modifications of the instant invention will be apparent to those skilled in the art without departing from the spirit and scope thereof.

I claim:

1. As an article of manufacture a substrate material selected from the group consisting of I–VII compounds, III–V compounds, silicon and germanium and mixtures thereof, and having superposed on said substrate material and in epitaxial relation therewith at least one layer of a material comprising combinations of elements selected from the group consisting of beryllium, zinc, cadmium, mercury, sulfur, selenium and tellurium, said layer(s) having different electrical conductivity than any adjacent layer(s) and said substrate when in contact therewith.

2. Article according to claim 1 wherein said substrate material and said layer(s) in epitaxial relation therewith contain a small amount of a doping element to provide different conductivity type between said layer(s) and said substrate materials.

3. As a article of manufacture a substrate material comprising gallium arsenide, and having superposed thereon and in epitaxial relation therewith a layer of zinc selenide having different electrical conductivity than said gallium arsenide substrate.

4. Article according to claim 3 wherein said substrate gallium arsenide contains a small amount of a doping element to provide p-type conductivity, and said layer in epitaxial relation to said substrate contains a small amount of a doping element to provide n-type conductivity.

5. As an article of manufacture a substrate material comprised of compounds selected from the group consisting of I–VII compounds, III–V compounds, silicon and germanium and mixtures thereof, and having superposed on said substrate a plurality of layers of epitaxial films comprising combinations of elements selected from the class consisting of beryllium, zinc, cadmium, mercury, sulfur, selenium and tellurium, each layer being epitaxially connected to adjacent layers and having different electrical conductivity type by incorporation therein of a small amount of a doping agent.

6. Semiconductor devices comprising as the semiconducting component thereof a substrate material selected from the class comprising I–VII compounds, III–V compounds, silicon and germanium and mixtures thereof, said substrate material having deposited thereon at least one epitaxial film comprising combinations of elements selected from the class consisting of beryllium, zinc, cadmium, mercury, sulfur, selerium and tellurium, said film(s) having different electrical conductivity type than said substrate.

References Cited by the Examiner

UNITED STATES PATENTS

| | | | |
|---|---|---|---|
| 2,692,839 | 10/1954 | Christensen et al. | 148—175 |
| 2,763,581 | 9/1956 | Freedman | 148—175 |
| 2,798,989 | 7/1957 | Welker | 148—1.5 |
| 2,810,052 | 10/1957 | Bube et al. | 252—62.3 X |
| 2,858,275 | 10/1958 | Folberth | 148—1.5 X |
| 2,929,859 | 3/1960 | Loferski | 252—62.3 |
| 2,966,434 | 12/1960 | Hibberd | 148—33.4 |
| 3,025,192 | 3/1962 | Lowe | 148—33 |
| 3,072,507 | 1/1963 | Anderson | 148—33.4 |

FOREIGN PATENTS

| | | |
|---|---|---|
| 1,193,194 | 10/1959 | France. |
| 1,029,941 | 5/1958 | Germany. |

OTHER REFERENCES

Anderson: "Semiconductor Device," IBM Technical Disclosure Bulletin, vol. 3, No. 2, July 1960, p. 44.

Lyons et al.: "Forming a Compound PN Junction," IBM Technical Disclosure Bulletin, vol. 3, No. 8, January 1961, p. 31.

Marinace: "Vapor Growth of InSb Crystals by an Iodine Reaction," IBM Technical Disclosure Bulletin, vol. 3, No. 8, January 1961, p. 33.

DAVID L. RECK, *Primary Examiner.*

MARCUS U. LYONS, *Examiner.*

M. A. CIOMEK, N. F. MARKVA, O. MARJAMA, C. N. LOVELL, *Assistant Examiners.*